Dec. 22, 1925.                                                1,566,659
                      J. DUTTON
      BALANCED FRICTION DRIVING MECHANISM FOR ACTUATING
            ROTARY BRUSHES, ROLLERS, AND SUCH LIKE
                   Filed Sept. 16, 1924
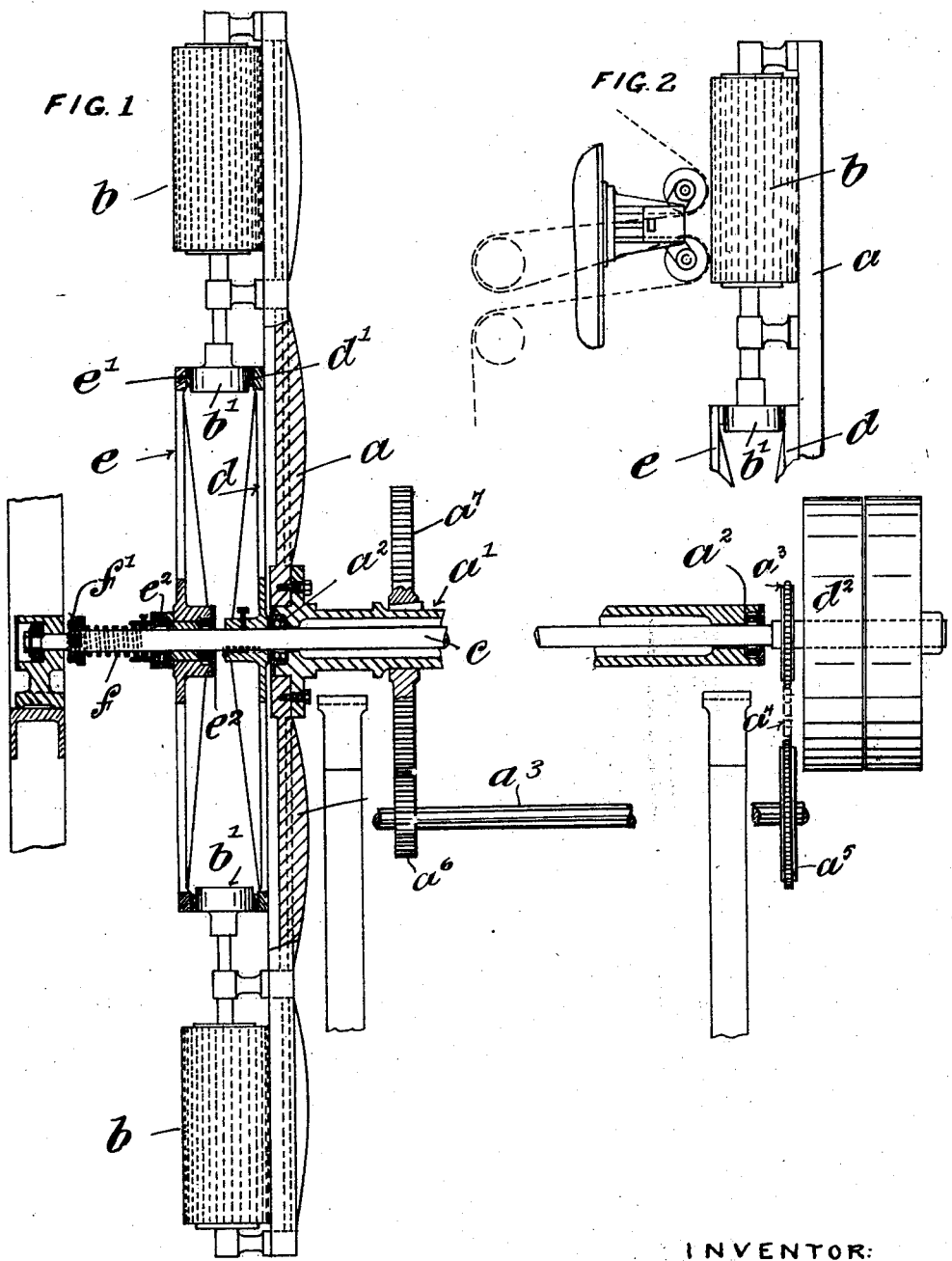
INVENTOR:
Joseph Dutton
BY: Francis E. Boyce
ATTORNEY Patented Dec. 22, 1925.

1,566,659

UNITED STATES PATENT OFFICE.

JOSEPH DUTTON, OF MANCHESTER, ENGLAND.

BALANCED FRICTION DRIVING MECHANISM FOR ACTUATING ROTARY BRUSHES, ROLLERS, AND SUCH LIKE.

Application filed September 16, 1924. Serial No. 737,931.

*To all whom it may concern:*

Be it known that I, JOSEPH DUTTON, a subject of the King of Great Britain and Ireland, residing at Salford, Manchester, in the county of Lancaster, England, have invented new and useful Improvements in Balanced Friction Driving Mechanism for Actuating Rotary Brushes, Rollers, and Such like, of which the following is a specification.

My invention has reference to an improved friction or balanced rolling contact drive by means of which circular brushes, rollers, drums, cylinders or revolvable bodies can be driven from discs, circular plates or any other provided rotating surfaces.

Under my invention for driving circular brushes I effect a drive by allowing the friction pulleys on the brushes or the like (and which brushes are supported in bearings on a carrier) to contact with a driven disc as for instance they may contact over a comparatively narrow frictional area applied to the driven disc.

A second disc is employed which is not positively driven and the friction pulleys on the brushes or the like also contact with such second disc. The two discs in effect are spaced apart and the friction pulleys of the brushes lie or intervene between the discs, that is, the friction pulleys contact with the spaced discs on the inner provided faces and near to the peripheries. As stated, one disc is positively driven by any suitable means, but the other is not. A spring or springs or equivalent means force the loose disc into contact with the friction pulleys and also maintain the driving disc in contact whereby the friction pulleys are gripped between two discs one driven and the other not.

The driving effect obtained, is the rubbing or rotating effect of two pressing and rotating discs which spin the friction pulleys or the like around on their axes and effect the driving of the brushes or the like without imparting any strain or pressure on any bearings. One disc being loose it serves to balance the drive and to distribute an even pressure between the discs and the interposed friction surfaces to be driven.

A practical embodiment of my invention is indicated in the attached drawing which shows the improvements in connection with a rotary brushing machine for brushing velvets, velveteens, and such like, only so much of the machine being illustrated as is necessary to explain the improvements.

In the said drawing:

Fig. 1 is a broken sectional elevation showing part of a rotary brushing machine with the improved driving arrangement.

Fig. 2 shows how the radially arranged and revolving brushes act in known fashion on passing fabric to be brushed or treated.

In the construction of drive illustrated for actuating a number of circular brushes radially disposed, I make use of a large carrying disc $a$ which supports the brushes $b$ the axles of which are sustained in proper bearings. Such carrying disc $a$ is shown supported upon a long hollow sleeve $a'$ which is suitably driven from the driving shaft $c$ by gearing $a^3$, $a^4$, $a^5$, $a^6$ and $a^7$ and is adapted to run on ball or roller or other bearings. In the drawings radial ball bearings $a^2$, $a^2$ are shown. A central driving shaft $c$ supports the driving friction disc $d$, the driving friction disc $d$ being keyed or otherwise fixed in position on the shaft $c$, said disc $d$ being of smaller diameter than the carrying disc $a$. This driving friction disc $d$ preferably has a ring of friction material $d'$ and its shaft may be driven in any known manner as for example by the fast pulley $d^2$. The non-driven disc $e$ faces the driven friction disc and this runs loosely on ball or roller or other bearings arranged about the driving shaft $c$. The non-driven disc $e$ has a ring of friction material $e'$ secured to it and the pulleys $b'$ of the radial brushes lie intermediate of the two discs $d$ and $e$. A spring $f$ surrounds the driving shaft $c$ and is adjusted by a washer and nut $f'$ or otherwise to exert a pressure on the non-driving disc $e$. The spring $f$ serves also to hold up the driving friction disc $d$ to its work and to cause the two discs $d$ and $e$ to press on the driving pulleys $b'$ of the brushes and to ensure the rubbing drive which it is desired to obtain, whereby, on rotation of the two discs $d$ and $e$, the interposed brushes are rotated with absolutely equal balance and without strain on the bearings.

The gearing between the shaft $c$ and the sleeve $a'$ by means of which the latter is rotated, is preferably such that the sleeve will rotate in a direction opposite from the direction of rotation of the shaft, as indicated in the drawing.

The driving shaft $c$ may be supported at any number of points, three being shown in the drawings, and the non-driven disc $e$ may run on two sets of ball or other bearings such as $e^2$, $e^2$, such bearings being confined between a cover and sleeve fitting about the shaft and which serve to enclose or complete the housing for the ball or like bearings.

I declare that what I claim is:

1. A device of the character described, comprising, in combination, a driving shaft, a disk mounted on said shaft for rotation relatively thereto, a plurality of rotatable brushes radially disposed on said disk and adapted to be moved bodily around the axis of the disk, a friction disk secured to said shaft for rotation therewith, means in engagement with said friction disk for rotating said brushes on their own axes, and gearing between said shaft and first disk for rotating the latter.

2. A device of the character described, comprising, in combination, a driving shaft, a disk mounted on said shaft for rotation relatively thereto, a plurality of rotatable brushes radially disposed on said disk and adapted to be moved bodily around the axis of the disk, a friction disk secured to said shaft for rotation therewith, means in engagement with said friction disk for rotating said brushes on their own axes, and gearing between said shaft and first disk for rotating the latter in a direction opposite to that of the shaft.

3. A device of the character described, comprising, in combination, a driving shaft, a disk mounted on said shaft for rotation relatively thereto, a plurality of rotatable brushes radially disposed on said disk and adapted to be moved bodily around the axis of the disk, a friction disk secured to said shaft for rotation therewith, friction means in engagement with said friction disk for rotating said brushes on their own axes, a pressure disk loosely mounted on the shaft in opposed relation to said friction disk and adapted to maintain said brush-rotating means in contact with said friction disk, and gearing between said shaft and first disk for rotating the latter.

In testimony whereof I have signed my name to this specification.

JOSEPH DUTTON.